(12) United States Patent
Oepts et al.

(10) Patent No.: US 9,313,838 B2
(45) Date of Patent: Apr. 12, 2016

(54) ADAPTABLE DRIVER CIRCUIT FOR DRIVING A LIGHT CIRCUIT

(75) Inventors: Wouter Oepts, Eindhoven (NL); Dan Maarten Kerst Jens, Weeze (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 210 days.

(21) Appl. No.: 13/989,472

(22) PCT Filed: Nov. 22, 2011

(86) PCT No.: PCT/IB2011/055234
§ 371 (c)(1),
(2), (4) Date: May 24, 2013

(87) PCT Pub. No.: WO2012/073152
PCT Pub. Date: Jun. 7, 2012

(65) Prior Publication Data
US 2013/0249430 A1  Sep. 26, 2013

(30) Foreign Application Priority Data
Dec. 3, 2010 (EP) .................................... 10193686

(51) Int. Cl.
*H05B 41/16* (2006.01)
*H05B 33/08* (2006.01)
(52) U.S. Cl.
CPC ........ *H05B 33/0809* (2013.01); *H05B 33/0848* (2013.01)
(58) Field of Classification Search
None
See application file for complete search history.

(56) References Cited

U.S. PATENT DOCUMENTS

| 8,810,555 | B2 * | 8/2014 | Pietro et al. ................... 345/208 |
| 2006/0000963 | A1 | 1/2006 | Ng et al. |
| 2006/0208670 | A1 | 9/2006 | Chang et al. |
| 2006/0261754 | A1 | 11/2006 | Lee |
| 2008/0129223 | A1 | 6/2008 | Choi |
| 2008/0238341 | A1 | 10/2008 | Korcharz et al. |
| 2010/0102752 | A1 | 4/2010 | Chen et al. |
| 2010/0188024 | A1 | 7/2010 | Deuenberg et al. |

FOREIGN PATENT DOCUMENTS

| CN | 101437340 A | 5/2009 |
| WO | 2007049180 A1 | 5/2007 |

OTHER PUBLICATIONS

Wouter Oepts; "Spot Lighting Module (SLM), Color Calibration and Tuning Algorithms", GBU LED Lamps and Systems, Philips Lighting B.V., pp. 1-32.

* cited by examiner

*Primary Examiner* — Cassandra Cox

(57) ABSTRACT

Driver circuits (20) for driving light circuits (21) comprising light emitting diodes are provided with converters (22) for converting input signals into output signals comprising pulses per cycle. The converters (22) comprise adapters (33) for, in response to differences between measured amplitude values of the input/output signals and nominal amplitude values of the input/output signals, adapting widths of the pulses. Then, signals having relatively precise amplitudes are no longer required. Said adapting may comprise increasing/decreasing the widths in case the measured amplitude value is smaller/larger, respectively, than the nominal amplitude value. The measured amplitude value divided by the nominal amplitude value is equal to a correction value. An adjusted duty cycle of the output signal may be made equal to a nominal duty cycle of the output signal divided by the correction value. Said adapting may be performed in a production/testing process environment.

11 Claims, 2 Drawing Sheets

ADAPTABLE DRIVER CIRCUIT FOR DRIVING A LIGHT CIRCUIT

FIELD OF THE INVENTION

The invention relates to a driver circuit for driving a light circuit comprising at least one light emitting diode.

The invention further relates to a device comprising a driver circuit, to a method of making an adaptation in a driver circuit, to a computer program product, and to a medium.

Examples of such a device are lamps and other kinds of light emitting diode devices.

BACKGROUND OF THE INVENTION

A driver circuit for driving a light circuit comprising at least one light emitting diode is of common general knowledge. Such a driver circuit comprises for example a source for producing an input signal, or is coupled to such a source. Owing to the fact that a relatively small amplitude difference between first and second output signals from first and second driver circuits may result in first and second light circuits producing mutually different light outputs, the mutually different light outputs having mutually different color points, the input signal should be produced relatively precisely. To produce the input signal relatively precisely, relatively precise components should be used. Such relatively precise components are relatively expensive.

SUMMARY OF THE INVENTION

It is an object of the invention to provide a driver circuit that does not require the use of relatively precise components for producing a signal relatively precisely.

Further objects of the invention are to provide: a device comprising a driver circuit, a method of making an adaptation in a driver circuit, a computer program product, and a medium.

According to a first aspect, a driver circuit is provided for driving a light circuit comprising at least one light emitting diode, the driver circuit comprising a converter for converting an input signal into an output signal comprising a pulse per cycle, the converter comprising an adapter for, in response to a difference between a measured amplitude value of the input or output signal and a nominal amplitude value of the input or output signal, adapting a width of the pulse.

The driver circuit is provided with a converter for converting an input signal into an output signal comprising a pulse per cycle. By measuring an amplitude value of the input signal and/or of the output signal, by establishing a difference between a measured amplitude value of the input signal and/or of the output signal and a nominal value of the input signal and/or of the output signal, and by providing the converter with an adapter for, in response to the difference, adapting a width of the pulse, an amplitude variation (deviation, deflection) in the input signal and/or in the output signal can be compensated. Such a compensation needs to be done only once. As a result, it is not longer necessary to use relatively precise components for producing a signal relatively precisely in or near the driver circuit.

The driver circuit is further advantageous in that variations (deviations, deflections) in the input signal and/or in the output signal resulting from the use of relatively inexpensive components as well as variations (deviations, deflections) in the input signal and/or in the output signal resulting from other kinds of facts can be compensated.

The light circuit may comprise one light emitting diode or may comprise several light emitting diodes in a serial and/or parallel combination. The input signal may be a current signal or a voltage signal. The output signal may be a current signal or a voltage signal. In case the input signal is a voltage signal, the converter may convert it into a current signal, or the converter may convert it into a voltage signal, in which case the converter may be followed by a further converter for making a voltage-to-current conversion. In case the output signal is a voltage signal, the converter may be followed by a further converter for making a voltage-to-current conversion. Owing to the fact that a light emitting diode is usually supplied with a current signal, preferably the input signal and the output signal will be current signals. In this way it is avoided that the converter needs to make a voltage-to-current conversion and that the further converter is required. A nominal amplitude value is for example a desired amplitude value.

An embodiment of the driver circuit is defined by said adapting comprising increasing the width of the pulse in case the measured amplitude value is smaller than the nominal amplitude value, and said adapting comprising decreasing the width of the pulse in case the measured amplitude value is larger than the nominal amplitude value. A smaller signal should result in a pulse having a longer duration, and a larger signal should result in a pulse having a shorter duration, to keep the amount of power per output signal relatively constant.

An embodiment of the driver circuit is defined by the measured amplitude value divided by the nominal amplitude value being equal to a correction value, and an adjusted duty cycle of the output signal being equal to a nominal duty cycle of the output signal divided by the correction value. A smaller amplitude should result in a larger duty cycle, and a larger amplitude should result in a smaller duty cycle, to keep the amount of power per output signal relatively constant. The correction value is a fraction, and a non-zero difference between the measured amplitude value of the input signal and/or of the output signal and the nominal value of the input signal and/or of the output signal results in a fraction different from the value "one".

An embodiment of the driver circuit is defined by the driver circuit not comprising a feedback circuit for feeding back an optical output of the light circuit to the driver circuit. The presence of a feedback circuit for feeding back an optical output of the light circuit to the driver circuit would make the adapter superfluous and would make the driver circuit more expensive.

An embodiment of the driver circuit is defined by said adapting being performed in a production and/or testing process environment. In such a production and/or testing process environment, certain tests and certain measurements need to be done, and here the measurement and the adaptation described above can be easily implemented.

An embodiment of the driver circuit is defined by the light circuit being a first light circuit, the at least one light emitting diode being at least one first light emitting diode, the converter being a first converter, the input signal being a first input signal, the output signal comprising the pulse per cycle being a first output signal comprising a first pulse per first cycle, the adapter being a first adapter, the difference between the measured amplitude value of the input or output signal and the nominal amplitude value of the input or output signal being a first difference between a first measured amplitude value of the first input or first output signal and a first nominal amplitude value of the first input or first output signal, and the width of the pulse being a first width of the first pulse, wherein the driver circuit is arranged for driving a second light circuit comprising at least one second light emitting diode, the driver circuit comprising a second converter for converting a second input signal into a second output signal comprising a second pulse per second cycle, the second converter comprising a second adapter for, in response to a second difference between a second measured amplitude value of the second input or second output signal and a second nominal amplitude value of the second input or second output signal, adapting a second width of the second pulse.

For example, when driving first and second light circuits comprising first and second light emitting diodes of for example different colors, it is important to avoid shifted color points, since two individual shifted color points of the two individual light circuits may result in one general even more shifted color point of the group of two light circuits. More light circuits and more converters are not to be excluded.

An embodiment of the driver circuit is defined by said adapting by the first adapter comprising increasing the first width of the first pulse in case the first measured amplitude value is smaller than the first nominal amplitude value, said adapting by the first adapter comprising decreasing the first width of the first pulse in case the first measured amplitude value is larger than the first nominal amplitude value, said adapting by the second adapter comprising increasing the second width of the second pulse in case the second measured amplitude value is smaller than the second nominal amplitude value, and said adapting by the second adapter comprising decreasing the second width of the second pulse in case the second measured amplitude value is larger than the second nominal amplitude value.

An embodiment of the driver circuit is defined by the first measured amplitude value divided by the first nominal amplitude value being equal to a first correction value, a first adjusted duty cycle of the first output signal being equal to a first nominal duty cycle of the first output signal divided by the first correction value, the second measured amplitude value divided by the second nominal amplitude value being equal to a second correction value, and a second adjusted duty cycle of the second output signal being equal to a second nominal duty cycle of the second output signal divided by the second correction value.

An embodiment of the driver circuit is defined by said adapting by the first and second adapters comprising comparing each one of the first and second adjusted duty cycles with a threshold duty cycle value, a duty cycle ratio being equal to the first adjusted duty cycle divided by the second adjusted duty cycle, and said adapting by the first and second adapters comprising, in case one or more of the first and second adjusted duty cycles is larger than the threshold duty cycle value, reducing the first and second adjusted duty cycles while keeping the duty cycle ratio constant. A threshold duty cycle value is for example 100%; duty cycles larger than 100% should not be possible. Other threshold duty cycles may be possible depending on the kind of application.

An embodiment of the driver circuit is defined by said adapting by the first and second adapters comprising calculating the total power dissipation in the first and second light circuits, the duty cycle ratio being equal to the first adjusted duty cycle divided by the second adjusted duty cycle, and said adapting by the first and second adapters comprising, in case the total power dissipation is larger than a threshold power dissipation value, reducing the first and second adjusted duty cycles while keeping the duty cycle ratio constant. A threshold power dissipation value is for example 26 Watt; more power dissipation should not be possible in certain applications. Other threshold power dissipation values may be possible, depending on the kind of application.

According to a second aspect, a device is provided comprising the driver circuit and further comprising the light circuit.

According to a third aspect, a method is provided for making an adaptation in a driver circuit for driving a light circuit comprising at least one light emitting diode, the driver circuit comprising a converter for converting an input signal into an output signal comprising a pulse per cycle, the method comprising a step of, in response to a difference between a measured amplitude value of the input or output signal and a nominal amplitude value of the input or output signal, adapting the width of the pulse.

An embodiment of the method is defined by said adapting being performed in a production and/or testing process environment.

According to a fourth aspect, a computer program product is provided which, when run on a computer, is intended for performing the method.

According to a fifth aspect, a medium is provided for storing and comprising the computer program product.

The computer program product may be implemented in and the medium may form part of a driver circuit for driving a light circuit comprising at least one light emitting diode, the driver circuit comprising a converter for converting an input signal into an output signal comprising a pulse per cycle. The computer program product and the medium may be located inside or outside the converter. The medium may further be used for storing the widths of pulses and/or the measured and nominal amplitude values and/or the correction values and/or the adjusted and nominal duty cycles and/or the threshold duty cycle values and/or the duty cycle ratios and/or the calculated total power dissipation and/or the threshold power dissipation values.

An insight gained could be that an amplitude variation in a signal in a driver circuit for driving a light circuit comprising a light emitting diode may result in a shifted color point in an optical output of the light circuit.

A basic idea could be that a converter for converting an input signal into an output signal comprising a pulse per cycle may be provided with an adapter for, in response to a difference between a measured amplitude value of the input or output signal and a nominal amplitude value of the input or output signal, adapting the width of the pulse.

The problem to provide a driver circuit that does not require the use of relatively precise components for producing a signal relatively precisely has been solved.

A further advantage could be that variations resulting from the use of relatively inexpensive components as well as variations resulting from other kinds of facts can be compensated.

These and other aspects of the invention will be apparent from and elucidated with reference to the embodiments described hereinafter.

DETAILED DESCRIPTION OF EMBODIMENTS

Figure 1:
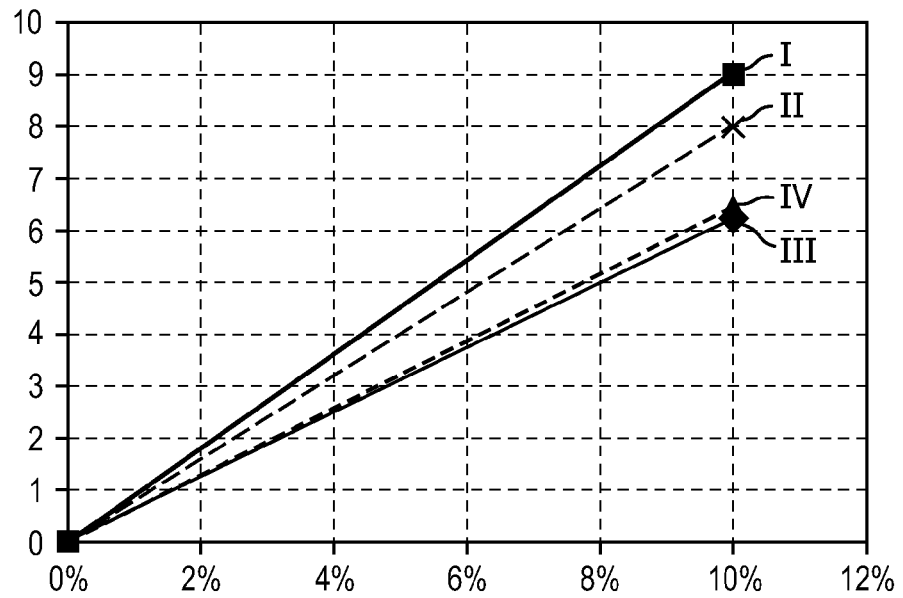
FIG. 1 shows a standard deviation color matching (SDCM, vertical axis) versus flux decrease in percentage (%, horizontal axis) for the colors red I (2700 K), purple II (3000 K), blue III (4000 K) and yellow-green IV (6500 K).

In FIG. 1, a standard deviation color matching (SDCM, vertical axis) versus flux decrease in percentage (%, horizontal axis) for the colors red I (2700 K), purple II (3000 K), blue III (4000 K) and yellow-green IV (6500 K) is shown. To the human eye, a color inaccuracy of more than three SDCM is visible and could be considered to be disturbing.

Figure 2:
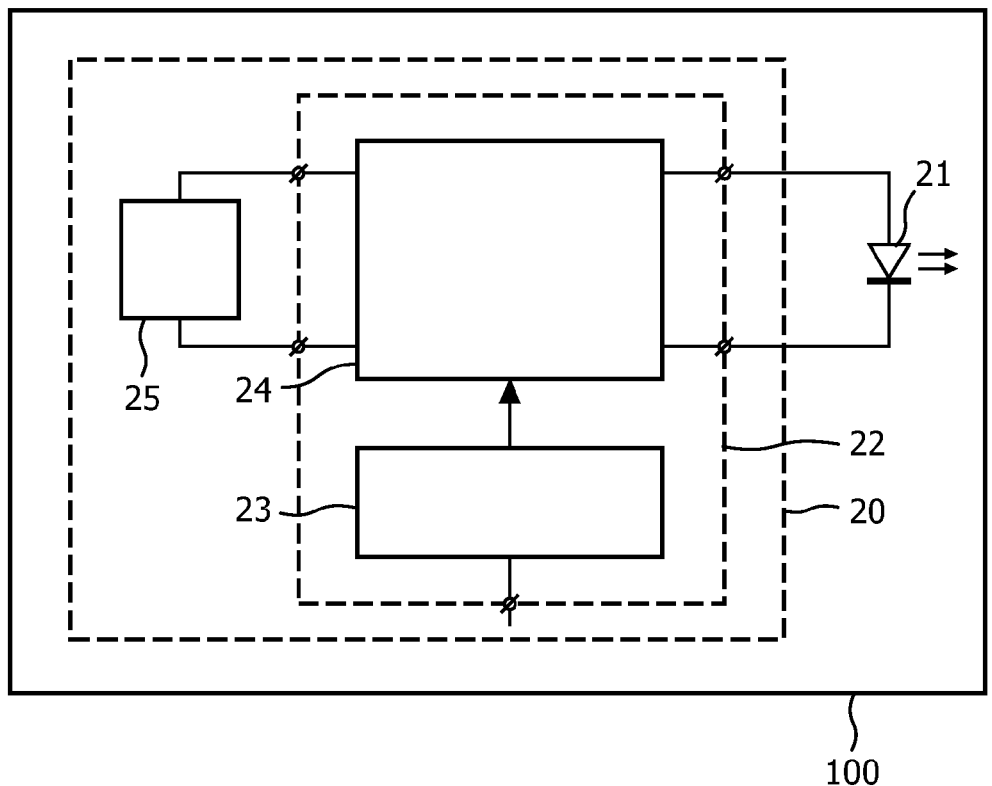
FIG. 2 shows a driver circuit for driving a first light circuit and comprising a first converter.

In FIG. 2, a driver circuit 20 for driving a first light circuit 21 comprising at least one first light emitting diode is shown. The driver circuit 20 comprises a first converter 22 for converting a first input signal into a first output signal comprising a first pulse per first cycle. The first input signal arrives via one or more first input terminals of the first converter 22 and for example originates from a first source 25 that may or may not form part of the driver circuit 20 and that may or may not form part of the device 100. The first output signal leaves via one or more first output terminals of the first converter 22 and is supplied to the first light circuit 21. The first converter 22 comprises a first adapter 23 for adapting a first width of the first pulse in response to a difference between a first measured amplitude value of the first input signal and/or of the first output signal and a first nominal amplitude value of the first input signal and/or of the first output signal.

In addition, the first converter 22 for example further comprises a first switching circuit 24 coupled to the first input terminals and the first output terminals of the first converter 22. A first control input of the first switching circuit 24 is coupled to a first control output of the first adapter 23 that has a first control input possibly coupled to a first control terminal of the first converter 22.

Said adapting by the first adapter 23 preferably comprises increasing the first width of the first pulse in case the first measured amplitude value is smaller than the first nominal amplitude value, and preferably comprises decreasing the first width of the first pulse in case the first measured amplitude value is larger than the first nominal amplitude value. Further, preferably, the first measured amplitude value divided by the first nominal amplitude value is defined to be equal to a first correction value, and a first adjusted duty cycle of the first output signal is made equal to a first nominal duty cycle of the first output signal divided by the first correction value. Said adapting by the first adapter 23 is preferably performed in a production and/or testing process environment.

Figure 3:
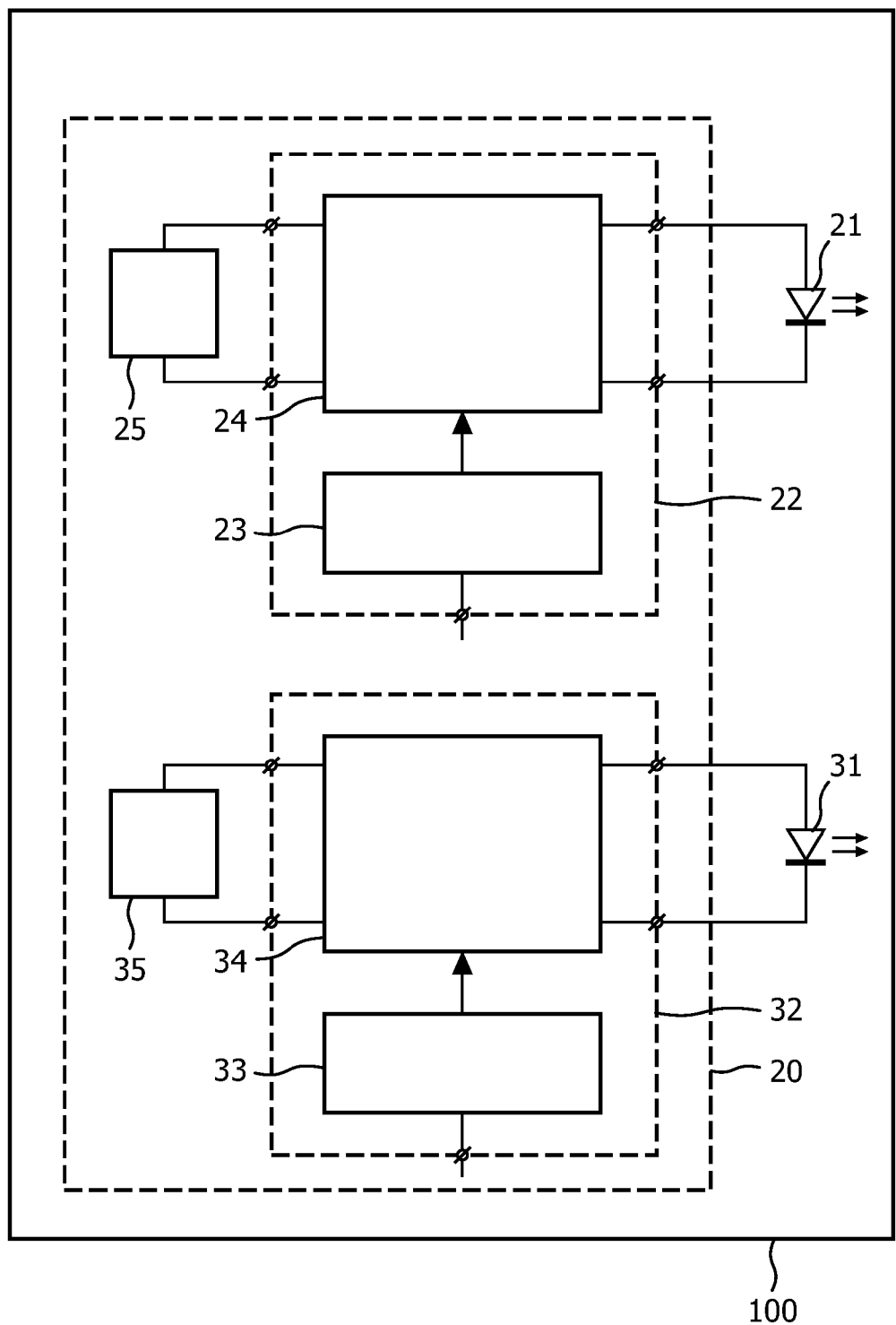
FIG. 3 shows a driver circuit for driving first and second light circuits and comprising first and second converters.

In FIG. 3, a driver circuit 20 for driving a first (second) light circuit 21 (31) comprising at least one first (second) light emitting diode is shown. The driver circuit 20 comprises a first (second) converter 22 (32) for converting a first (second) input signal into a first (second) output signal comprising a first (second) pulse per first (second) cycle. The first (second) input signal arrives via one or more of first (second) input terminals of the first (second) converter 22 (32) and for example originates from a first (second) source 25 (35) that may or may not form part of the driver circuit 20 and that may or may not form part of the device 100. The first (second) output signal leaves via one or more of first (second) output terminals of the first (second) converter 22 (32) and is supplied to the first (second) light circuit 21 (31). The first (second) converter 22 (32) comprises a first (second) adapter 23 (33) for adapting a first (second) width of the first (second) pulse in response to a difference between a first (second) measured amplitude value of the first (second) input signal and/or of the first (second) output signal and a first (second) nominal amplitude value of the first (second) input signal and/or of the first (second) output signal.

In addition, the first (second) converter 22 (32) for example further comprises a first (second) switching circuit 24 (34) coupled to the first (second) input terminals and the first (second) output terminals of the first (second) converter 22 (32). A first (second) control input of the first (second) switching circuit 24 (34) is coupled to a first (second) control output of the first (second) adapter 23 (33) that has a first (second) control input possibly coupled to a first (second) control terminal of the first (second) converter 22 (32).

Said adapting by the first adapter 23 preferably comprises increasing the first width of the first pulse in case the first measured amplitude value is smaller than the first nominal amplitude value, and preferably comprises decreasing the first width of the first pulse in case the first measured amplitude value is larger than the first nominal amplitude value. Said adapting by the second adapter 33 preferably comprises increasing the second width of the second pulse in case the second measured amplitude value is smaller than the second nominal amplitude value, and preferably comprises decreasing the second width of the second pulse in case the second measured amplitude value is larger than the second nominal amplitude value. Further, preferably, the first measured amplitude value divided by the first nominal amplitude value is defined to be equal to a first correction value, and a first adjusted duty cycle of the first output signal is made equal to a first nominal duty cycle of the first output signal divided by the first correction value. Further, preferably, the second measured amplitude value divided by the second nominal amplitude value is defined to be equal to a second correction value, and a second adjusted duty cycle of the second output signal is made equal to a second nominal duty cycle of the second output signal divided by the second correction value.

According to a possible embodiment, said adapting by the first and second adapters 23 and 33 may comprise comparing each one of the first and second adjusted duty cycles with a threshold duty cycle value, wherein a duty cycle ratio is defined to be equal to the first adjusted duty cycle divided by the second adjusted duty cycle. Then, said adapting by the first and second adapters 23 and 33 may comprise, in case one or more of the first and second adjusted duty cycles is larger than the threshold duty cycle value, reducing the first and second adjusted duty cycles while keeping the duty cycle ratio constant.

According to a possible embodiment, said adapting by the first and second adapters 23 and 33 may comprise calculating the total power dissipation in the first and second light circuits 21 and 31, wherein a duty cycle ratio is defined to be equal to the first adjusted duty cycle divided by the second adjusted duty cycle. Then, said adapting by the first and second adapters 23 and 33 may comprise, in case the total power dissipation is larger than a threshold power dissipation value, reducing the first and second adjusted duty cycles while keeping the duty cycle ratio constant.

The first (second) switching circuit 24 (34) for example comprises a half bridge or a full bridge or another kind of switching circuit. The first (second) adapter 23 (33) for example comprises a controller or a kind of processor. Alternatively, the first (second) adapter 23 (33) forms part of a controller or a kind of processor. Further, alternatively, the first (second) adapter 23 (33) may form part of the first (second) switching circuit 24 (34), or vice versa. Further units may be present.

The first (second) light circuit 21 (31) may comprise one light emitting diode or may comprise several light emitting diodes in a serial and/or parallel combination. The first (second) source 25 (35) may for example be an alternating-current-to-direct-current converter or AC/DC converter that produces a rectified and possibly smoothened first (second) input signal for the first (second) converter 22 (32). Another kind of first (second) source 25 (35) is not to be excluded, such as another kind of converter or a battery etc. Between the first (second) source 25 (35) and the first (second) converter 22

(32), a further unit may be present, such as a filter or a smoothening unit etc. The first (second) input signal as supplied to the first (second) converter 22 (32) may be a current signal or a voltage signal. The first (second) output signal as produced by the first (second) converter 22 (32) may be a current signal or a voltage signal. Owing to the fact that a light emitting diode is usually supplied with a current signal, preferably the first (second) input signal and the first (second) output signal will be current signals. This way, it is avoided that the first (second) converter 22 (32) needs to make a voltage-to-current conversion and/or that an additional converter behind the first (second) converter 22 (32) is required for making a voltage-to-current conversion.

The first and second adapters 23 and 33 may be fully separate adapters or may be adapters having a mutual part or may be combined/integrated into one unit having several outputs. The first and second switching circuits 24 and 34 may be fully separate switching circuits or may be switching circuits having a mutual part. The first and second sources 25 and 35 may be fully separate sources or may be sources having a mutual part or may be combined/integrated into one unit having several outputs. Three or more converters are not to be excluded, such as four converters in a driver circuit 20 for driving four light circuits that for example produce red light, green light, blue light and white light.

The measured and nominal amplitude values of the input signals may be any kind of average amplitude values or any kind of instantaneous amplitude values. The measured and nominal amplitude values of the output signals may be any kind of average amplitude values or any kind of instantaneous amplitude values of the pulses of the output signals.

Summarizing, driver circuits 20 for driving light circuits 21 comprising light emitting diodes are provided with converters 22 for converting input signals into output signals comprising pulses per cycle. The converters 22 comprise adapters 33 for, in response to differences between measured amplitude values of the input/output signals and nominal amplitude values of the input/output signals, adapting widths of the pulses. Then, signals having relatively precise amplitudes are no longer required. Said adapting may comprise increasing/decreasing the widths in case the measured amplitude value is, respectively, smaller/larger than the nominal amplitude value. The measured amplitude value divided by the nominal amplitude value is equal to a correction value. An adjusted duty cycle of the output signal may be made equal to a nominal duty cycle of the output signal divided by the correction value. Said adapting may be performed in a production/testing process environment.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope thereof.

The invention claimed is:

1. A driver circuit for driving a light circuit comprising at least one light emitting diode, the driver circuit comprising:

a converter for converting an input signal into an output signal comprising a pulse per cycle, the converter comprising
  an adapter for, in response to a difference between a measured amplitude value of the input or output signal and a nominal amplitude value of the input or output signal, adapting the width of the pulse by increasing the width of the pulse in case the measured amplitude value is smaller than the nominal amplitude value, and said adapting comprising decreasing the width of the pulse in case the measured amplitude value is larger than the nominal amplitude value.

2. The driver circuit as defined in claim 1, the measured amplitude value divided by the nominal amplitude value being equal to a correction value, and an adjusted duty cycle of the output signal being equal to a nominal duty cycle of the output signal divided by the correction value.

3. The driver circuit as defined in claim 1, the driver circuit not comprising a feedback circuit for feeding back an optical output of the light circuit to the driver circuit.

4. The driver circuit as defined in claim 1, said adapting being performed in a production and/or testing process environment.

5. The driver circuit as defined in claim 1, the light circuit being a first light circuit, the at least one light emitting diode being at least one first light emitting diode, the converter being a first converter, the input signal being a first input signal, the output signal comprising the pulse per cycle being a first output signal comprising a first pulse per first cycle, the adapter being a first adapter, the difference between the measured amplitude value of the input or output signal and the nominal amplitude value of the input or output signal being a first difference between a first measured amplitude value of the first input or first output signal and a first nominal amplitude value of the first input or first output signal, and the width of the pulse being a first width of the first pulse, wherein the driver circuit is arranged for driving a second light circuit comprising at least one second light emitting diode, the driver circuit comprising a second converter for converting a second input signal into a second output signal comprising a second pulse per second cycle, the second converter comprising a second adapter for, in response to a second difference between a second measured amplitude value of the second input or second output signal and a second nominal amplitude value of the second input or second output signal, adapting a second width of the second pulse.

6. The driver circuit as defined in claim 5, said adapting by the first adapter comprising increasing the first width of the first pulse in case the first measured amplitude value is smaller than the first nominal amplitude value; said adapting by the first adapter comprising decreasing the first width of the first pulse in case the first measured amplitude value is larger than the first nominal amplitude value; said adapting by the second adapter comprising increasing the second width of the second pulse in case the second measured amplitude value is smaller than the second nominal amplitude value, and said adapting by the second adapter comprising decreasing the second width of the second pulse in case the second measured amplitude value is larger than the second nominal amplitude value.

7. The driver circuit as defined in claim 6, the first measured amplitude value divided by the first nominal amplitude value being equal to a first correction value, a first adjusted duty cycle of the first output signal being equal to a first nominal duty cycle of the first output signal divided by the first correction value, the second measured amplitude value divided by the second nominal amplitude value being equal to a second correction value, and a second adjusted duty cycle of the second output signal being equal to a second nominal duty cycle of the second output signal divided by the second correction value.

8. The driver circuit as defined in claim 7, said adapting by the first and second adapters comprising comparing each one of the first and second adjusted duty cycles with a threshold duty cycle value, a duty cycle ratio being equal to the first adjusted duty cycle divided by the second adjusted duty cycle, and said adapting by the first and second adapters comprising, in case one or more of the first and second adjusted duty cycles is larger than the threshold duty cycle value, reducing the first and second adjusted duty cycles while keeping the duty cycle ratio constant.

9. The driver circuit as defined in claim 7, said adapting by the first and second adapters comprising calculating the total power dissipation in the first and second light circuits, a duty cycle ratio being equal to the first adjusted duty cycle divided by the second adjusted duty cycle, and said adapting by the first and second adapters comprising, in case the total power dissipation is larger than a threshold power dissipation value, reducing the first and second adjusted duty cycles while keeping the duty cycle ratio constant.

10. A device comprising the driver circuit as defined in claim 1 and further comprising the light circuit.

11. A method of making an adaptation in a driver circuit for driving a light circuit comprising at least one light emitting diode, the driver circuit comprising a converter for converting an input signal into an output signal comprising a pulse per cycle, the method comprising a step of, in response to a difference between a measured amplitude value of the input or output signal and a nominal amplitude value of the input or output signal, adapting the width of the pulse by increasing the width of the pulse in case the measured amplitude value is smaller than the nominal amplitude value, and said adapting comprising decreasing the width of the pulse in case the measured amplitude value is larger than the nominal amplitude value.

* * * * *